April 12, 1960  F. M. YOUNG  2,932,489
TRUSSED RADIATOR CORE-UNIT
Filed April 28, 1958
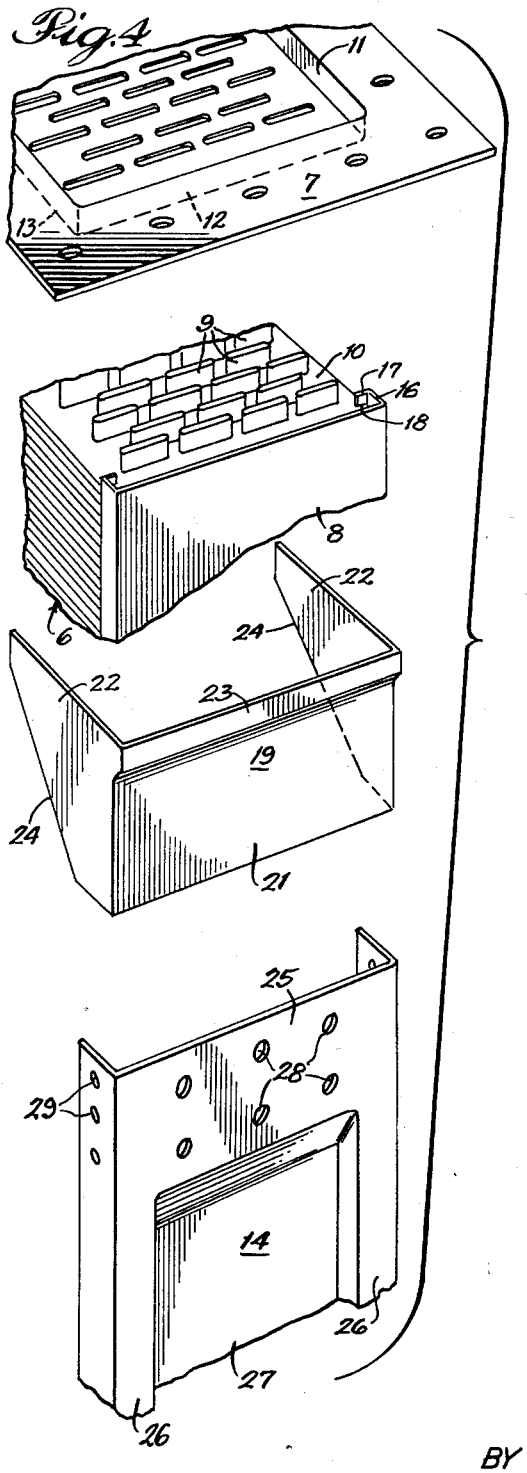
INVENTOR:
Fred M. Young,
BY
ATTORNEY.

United States Patent Office 2,932,489
Patented Apr. 12, 1960

2,932,489

TRUSSED RADIATOR CORE-UNIT

Fred M. Young, Racine, Wis., assignor to Young Radiator Company, Racine, Wis., a corporation of Wisconsin Application April 28, 1958, Serial No. 731,297

5 Claims. (Cl. 257—154)

This invention relates to heat exchangers of the type wherein the fin-supported tubes have their ends bonded to perforate headers which headers are spanned by channel-shaped side plates bonded at their ends to the headers, and in some instances bonded intermediate their ends to the fins.

In heat exchangers of this kind the core is made up of a battery of parallel, closely-spaced tubes extending through and supporting closely-shaped, transverse fin sheets. The ends of the tubes protrude beyond the opposite outermost fin sheets and are bonded to perforate headers. Generally, the tubes are made of copper and solder bonded to the headers which, as a rule, are made of brass. To provide a more rigid structure in such a core, steel plates are arranged on opposite sides of the core and have to have their ends soldered to the headers. Usually, these plates are channel shaped.

The soldering of the tube ends to the headers and the soldering of the side plate ends to the headers has always presented a problem to the manufacturers of heat exchangers. The problem arises from two facts; (1) soldering is done at temperatures approximately 500° F. whereas the brazing is done at temperatures approximately 1200° F., and (2) it is more practical to solder the tubes to the headers before the side plates are brazed to the headers. Subjecting the solder-bonded tubes, adjacent the header ends where the side plates are brazed, to the higher temperatures than required for the solder bonding hazards the risk of melting some of the solder around the tubes and weakening if not breaking the tube end bonds to the headers.

The main objects of this invention, therefore, are to provide an improved trussed structure for the side plates of heat-exchanger core units; to provide an improved trussed-core-unit structure of this kind which obviates the soldering of the side plate ends to the headers after the tubes have been soldered to the headers; to provide an improved trussed radiator-core unit of this kind which affords a greater rigidity to the core unit than has heretofore been obtained; and to provide an improved trussed radiator core-unit of this kind comprising elements of such simple form and ease of assembly and bonding as to make for greater economy in production and longer service without repair or replacement of the units.

In the adaptation shown in the accompanying drawings:

Fig. 1 is an end view of one end of a trussed core unit constructed in accordance with this invention;

Fig. 2 is a side elevation of the same;

Fig. 3 is an enlarged, transverse sectional view taken on the plane of the line 3—3 of Fig. 1; and Fig. 4 is an exploded perspective of the several parts involved in this improved trussed radiator core-unit structure.

The essential concept of this invention involves a U-shaped gusset, embracively bonded along one perimeter to one end of a core-support header, and a channel-shaped side plate, the end of which is embracively bonded to the gusset below the aforesaid bond of the gusset to the header, the gusset and side plate being bonded respectively before and after the tubes are bonded to the header.

A conventional heat exchanger core unit 5, with which this improved trussed structure is designed for use, comprises a core 6 supported on headers 7 and reinforced with side plates 8.

The core 6 per se is made up of a plurality of parallel tubes 9 extending through perforate fin sheets 10 with the ends of the tubes protruding an appreciable distance beyond the opposite outermost fin sheets 10. In the adaptation herein shown, the tubes 9 are of elongated cross-section. However, in some types of core 6 the tubes 9 are round or elliptical. As a rule, the tubes are made of copper or an economical copper alloy.

The header 7 here is shown of rectangular form with the main part, inwardly of the perimeter, upset to form a disk-like depression 11 with the end and side rims 12 and 13 respectively inwardly of and parallel to the perimeter of the header 7. The depression 11 is apertured to slidingly receive the ends of the tubes 9 and to which header depression 11 the tube ends are solder bonded in the conventional manner. Headers of this type are copper or brass stampings, hence make practical solder bonding of tubes thereto.

The side plate 8, as herein shown, is supplementary to a primary side plate 14 which forms a part of this improved trussed structure, as presently will be explained fully. This inner side plate 8 is channel-shaped and is positioned along the side of the core 6 in the manner shown in Patent No. 2,599,965. The short transverse parts 16 embrace the fin sheets 10 and have the inwardly-turned flanges 17 seated in notches 18 in the opposite edges of the fin sheets 10.

A core-unit trussed structure embodying the hereinbefore defined concept comprises gussets 19 and the side plates 14. The gussets 19, of which normally there would be four for a conventional core unit 5, are of U-shape with a base part 21 and parallel arms 22. The base part 21 has the major portion thereof offset from an end strip 23. The arms 22 are tapered outwardly at 24 from the end of the depressed base part 21 so that the arms take on a pentagonal shape in which the tapered edge 24 subtends the angle formed by the base part 21 and the upper edges of the arms 22, as clearly is shown in Figs. 2 and 4.

The base end strip 23, formed by depressing or offsetting the greater part of the base part 21, is of a width substantially that of the depth of the depression 11 of the header 7. The space between the arms 22 is the same as the outside dimension of the header depression 11 transversely of the header 7. Thus the end of the gusset 14 fits snugly around the exterior end rims 12 of the header depression 11, with the arms 22 pressed against the side rims 13, as so clearly is illustrated in Figs. 1 and 2.

The gusset arms 22 are cut away on the taper 24 to reduce as much as possible obstruction to the free air flow between the fin sheets 10 and around the tubes 9 at the corners of the unit.

The gussets 19 generally are made of sheet steel which makes practical the brazing of them to the headers 7.

The plates 14 are of channel shape with the inside width between the transverse legs the same as the outside width of the arms 22 of the gusset 19, whereby the end 25 snugly embraces the gusset 19. Each plate 14 has the major portion of the base part, inwardly of the ends 25 and the lateral marginal portions 26, depressed as shown at 27. This permits the major portion of the plate 14 to be closely superimposed along the plate 8 when the plate 14 is bonded to the gussets 19. The ends 25 and the adjacent portions of the legs 24 each have a series of apertures 28 and 29 respectively formed therein. These are provided to facilitate a strong solder bonding of the plate ends to the gusset by reason of the capillary action which the superimposed parts have on the molten solder during the bonding operation.

A core unit 5, with a trussed structure embodying this invention, is assembled in the following manner:

The core 6, with its tubes and fin sheets 10, is assembled in the conventional manner. Headers 7, side plate 14 and gussets 19, of the forms herein set forth, are provided.

The first step in assembling is setting a gusset over one end of the header 7 with the end strip 23 resting against the rim 12 of the header depression and with the upper portions of the arms 22 pressing against the rims 13 of the header depression 11. The gusset so positioned is then brazed in place. A second gusset 19 is brazed at the other end of the header depression 11.

The next step is to place such a header 7 over the protruding tube ends of a core 6, whereupon the header is solder bonded to the tubes in a well-known manner.

Subsequently the other header 7 has the gussets 19 brazed thereto, as above set forth, and that header is solder bonded to the tube ends at the other end of the core 6.

The next step is to position a plate 14 with the apertured ends 25 embracing the gussets on opposite header 7. The plate ends, being appropriately clamped in position, are solder bonded to the gussets in a well-known manner. A second side plate 14 is similarly solder bonded to the other pair of gussets 19 on the opposite side of the core 6.

By first brazing the gussets 19 to the headers 7 and subsequently solder bonding the headers 7 to the tube ends of the core 6, and thereafter solder bonding the plates 14 to the gussets, the solder bond of the tubes to the header plates is not subject to deterioration, as currently is the case when the soldering of the side plates is done directly to the headers 7 after the headers have been solder bonded to the tubes of the core 6.

Such a structured core unit is produced with greater facility and results in a core unit of greater rigidity than is the case with core units of the conventional type.

Variations and modifications in the details of structure and arrangement of the parts may be resorted to with the spirit and coverage of the appended claims.

I claim:

1. A trussed radiator core-unit comprising, a battery of tubes extending through and supporting a series of closely-spaced transverse fin sheets with the tube ends protruding a material distance beyond the opposite outermost fin sheets, a pair of headers each having a rectangular-shaped depression offset by integral side rims from an outwardly-extending bordering flange parallel with the tube-supporting portion of the depression apertured to receive the protruding tube ends and bonded thereto, pairs of U-shaped gussets brazed along one perimeter of the opposite rims of the depressed parts of the headers so as to dispose the gussets oppositely inward from the respective headers adjacently along the sides of the series of fin sheets, and a pair of channel-shaped plates of a length less than the distance between the headers extending along opposite sides of the series of fin sheets between the opposed gussets and having the opposite plate ends embracively solder bonded to the respective gussets inwardly from the brazing of the gussets to the respective headers.

2. A trussed radiator core-unit comprising, a battery of tubes extending through and supporting a series of closely-spaced transverse fin sheets with the tube ends protruding a material distance beyond the opposite outermost fin sheets, a pair of headers each having a rectangular-shaped depression offset by integral side rims from an outwardly-extending bordering flange parallel with the tube-supporting portion of the depression apertured to receive the protruding tube ends and bonded thereto, pairs of U-shaped gussets each having a portion of the base part depressed from one transverse end thereof and having the parallel arms tapered outwardly from the end of the depressed portion, the gussets being brazed along the respective undepressed ends of each to opposite rims of the depressed part of the respective headers to dispose the depressed base portions of the gussets oppositely inward from the respective headers, and a pair of channel-shaped plates of a length less than the distance between the headers extending along the opposite sides of the series of fin sheets and having the opposite plate ends embracively solder bonded to the depressed base portions and the adjacent portions of the arms of the respective gussets inwardly from the bonding of the gussets to the respective headers.

3. A trussed radiator core-unit comprising, a battery of tubes extending through and supporting a series of closely-spaced transverse fin sheets with the tube ends protruding a material distance beyond the opposite outermost fin sheets, a pair of headers having a rectangular-shaped depression offset by integral side rims from an outwardly-extending bordering flange parallel with the tube-supporting portion of the depression apertured to receive the protruding tube ends and bonded thereto, pairs of U-shaped gussets each having a portion of the base part depressed from one transverse end thereof and having the parallel arms tapered outwardly from the end of the depressed portion, the gussets being brazed along the respective undepressed ends of each to opposite rims of the depressed parts of the respective headers to dispose the depressed base portions of the gussets oppositely inward from the respective headers, and a pair of channel-shaped plates of a length less than the distance between the headers having all of the main portion except the opposite ends and the intervening lateral marginal portions depressed inwardly, the undepressed ends of the plates and the adjacent transverse legs having apertures formed therein, the plates extending along the opposite sides of the series of fin sheets with the depressed portions closely opposed to the fin-sheet ends and having the apertured ends of the plates embracively solder bonded to the depressed base portion and the adjacent arm portions of the respective gussets inwardly from the brazing of the gussets to the respective headers.

4. A trussed radiator core-unit comprising, a battery of tubes extending through an supporting a series of closely-spaced transverse fin sheets with the tube ends protruding a material distance beyond the opposite outermost fin sheets, the fin sheets having slots extending inwardly from opposite edges adjacent the ends of the fin sheets, channel-shaped plates of a width between the transverse parallel parts substantially equal to the width of the fin sheets, the transverse parallel parts having flanges extending inwardly from the edges thereof, the plates being embracively positioned along opposite sides of the series of fin sheets and bonded thereto with the parallel-part flanges seated in the fin sheet slots, a pair of headers each having a rectangular-shaped depression offset by integral side rims from an outwardly-extending bordering flange parallel with the tube-supporting portion of the depression apertured to receive the protruding tube ends and bonded thereto, pairs of U-shaped gussets brazed along one perimeter of the opposite rims of the depressed part of the respective headers so as to dispose the gussets oppositely inward from the respective headers adjacently along the sides of the series of fin sheets, and a pair of other channel-shaped plates of a length less than the distance between the headers superimposed along the first-mentioned plates and having opposite ends embracively solder bonded to the respective gussets inwardly of the brazing of the gussets to the respective headers.

5. A trussed radiator core-unit comprising, a battery of tubes extending through and supporting a series of closely-spaced transverse fin sheets with the tube ends protruding a material distance beyond the opposite outermost fin sheets, the fin sheets having slots extending inwardly from opposite edges adjacent the ends of the fin sheets, channel-shaped plates of a width between the transverse parallel parts substantially equal to the width of the fin sheets, the transverse parallel parts having flanges extending inwardly from the edges thereof, the plates being embracively positioned along opposite sides of the series of fin sheets and bonded thereto with the parallel-parts flanges seated in the fin-sheet slots, a pair of headers each having a rectangular-shaped depression offset by integral side rims from an outwardly-extending bordering flange parallel with the tube-supporting portion of the depression apertured to receive the protruding tube ends and bonded thereto, pairs of U-shaped gussets each having a portion of the base part depressed from one transverse end thereof and having the parallel arms tapered outwardly from the end of the depressed portion, the gussets being brazed along the respective undepressed ends of each to opposite rims of the depressed parts of the respective headers to dispose the depressed base portions of the gussets oppositely inwardly from the respective headers, and a pair of other channel-shaped plates of a length less than the distance between the headers having all of the main portion of each except the opposite ends and the intervening lateral marginal portions depressed inwardly, the undepressed ends of the other plates and the adjacent transverse legs having apertures therein, the other channel-shaped plates being superimposed along the first-mentioned plates with the depressed portions in contact with the first-mentioned plates and having the apertured ends thereof embracively solder bonded to the depressed base portions and the adjacent portions of the arms of the respective gussets inwardly of the brazing of the gussets to the respective headers.

References Cited in the file of this patent

UNITED STATES PATENTS

| | | |
|---|---|---|
| 1,657,359 | Hendrix | Jan. 24, 1928 |
| 2,505,790 | Panthofer | May 2, 1950 |
| 2,525,087 | Young | Oct. 10, 1950 |
| 2,599,965 | Young | June 10, 1952 |